United States Patent

Oppenheimer et al.

[11] Patent Number: 5,982,492
[45] Date of Patent: Nov. 9, 1999

[54] METHOD OF AND APPARATUS FOR DETERMINING THE CENTER OF A GENERALLY CIRCULAR WORKPIECE RELATIVE TO A ROTATION AXIS OF THE WORKPIECE

[75] Inventors: Carl Oppenheimer, Kingston, N.H.; Mark Quaratiello, Medford, Mass.; Robert J. Bond, Newark, Calif.

[73] Assignee: Lam Research Corporation, Fremont, Calif.

[21] Appl. No.: 09/055,992

[22] Filed: Apr. 7, 1998

[51] Int. Cl.⁶ .................................................. G01B 11/00
[52] U.S. Cl. ............................................. 356/375; 356/385
[58] Field of Search ................................. 356/385, 394, 356/400, 399, 375; 250/559.3, 559.29

[56] References Cited

U.S. PATENT DOCUMENTS 5,644,400 7/1997 Mundt .
5,825,913 10/1998 Rostami et al. .................... 382/151

OTHER PUBLICATIONS

U.S. application No. 08/654,321, Huynh, filed Mar. 29, 1996.

*Primary Examiner*—Frank G. Font
*Assistant Examiner*—Tu T. Nguyen
*Attorney, Agent, or Firm*—Lowe Hauptman Gopstein Gilman & Berner

[57] ABSTRACT

The center of a semiconductor wafer relative to a rotation axis of a spindle carrying the wafer is detected by turning the spindle while a line source of optical radiation is directed at the wafer. A CCD linear optical detector array extending along a line between the spindle axis to a point beyond the wafer periphery effectively detects the amount of optical energy intercepted by the wafer. The source is turned on for a predetermined duration and the detector is read out in response to a shaft encoder detecting that the spindle has moved to each of many predetermined angles. A microprocessor responsive to the optical detector determines the length of the line each time the detector turns on by deriving an indication of the amount of optical energy accumulated by the CCD array each time the detector turns on. The microprocessor combines the determined line length indications to detect the workpiece center relative to the spindle axis.

25 Claims, 3 Drawing Sheets

METHOD OF AND APPARATUS FOR DETERMINING THE CENTER OF A GENERALLY CIRCULAR WORKPIECE RELATIVE TO A ROTATION AXIS OF THE WORKPIECE

FIELD OF INVENTION

The present invention relates generally to determining the center of a generally circular workpiece relative to a rotation axis of the workpiece using a line optical energy source and, more particularly, to such a method and apparatus wherein the optical energy is strobed on for a predetermined time interval many times while the workpiece is turning about the rotation axis.

BACKGROUND ART

The co-pending, commonly-assigned application Ser. No. 08/623,822 entitled "A METHOD AND APPARATUS FOR DETERMINING THE CENTER AND ORIENTATION OF A WAFER-LIKE OBJECT," filed Mar. 29, 1996, by Tac Huynh, now U.S. Pat. No. 5,822,215 discloses a fixedly positioned line or sheet source of optical energy in an apparatus for determining the center of a generally circular semiconductor wafer relative to an axis of a spindle for turning the wafer through one revolution. The source continuously projects onto the semiconductor wafer top face a line image that extends along a radial line between the spindle axis and the wafer periphery. The optical energy extends as a radial line beyond the wafer image for all reasonable positions of the wafer on a platform rotated by the spindle.

An optical detector fixedly positioned below the wafer includes a charge coupled device (CCD) linear array aligned with the line of optical energy projected toward the wafer. Hence, the linear CCD array extends from the spindle radially outward beyond the wafer periphery. As the spindle rotates the wafer, the amount of optical energy from the source incident on the CCD detector is directly proportional to the complement of the length of a line between the spindle axis of the wafer and the wafer periphery.

A computer coupled to an output of the CCD array responds to indications of the line length complement to calculate the displacement of the wafer center from the spindle rotation axis. The computer also determines the angle of wafer orientation relative to a reference angle by detecting the location of an abrupt change in curvature on the generally circular periphery of the wafer. The abrupt change can be detected since the wafer has one or more flats or a notch. The abrupt change is detected by differentiating the CCD output indicative of line length complement.

After the separation between the wafer center and spindle axis and the relative orientation of the abrupt change have been determined, a wafer aligner translates and rotates the wafer so the wafer center is on the spindle axis and the abrupt change has a predetermined orientation relative to the reference angle. The wafer, after being so positioned, is moved from the aligner to a processor of a wafer processing system.

We have realized that a problem with the prior art device is that a DC drive motor for the spindle is subject to turning at differing speeds. Consequently, output signals of the CCD array are not always exactly proportional to an indication of the length of the lines between the spindle axis and the wafer periphery and inaccuracies occur in the indications of the spindle and wafer rotation angles. These inaccuracies tend to prevent the wafer center and flat or notch positions from being accurately determined, whereby the wafer center is not accurately positioned on the spindle axis. Consequently, the wafers are subject to being incorrectly positioned in the processing chambers. Therefore, the processed wafers are subject to not having the full complement of integrated circuits produced thereon.

It is, accordingly, an object of the present invention to provide a new and improved method of and apparatus for determining the position of a generally circular workpiece center relative to a rotation axis of the workpiece.

A further object of the invention is to provide a new and improved method of and apparatus for determining the position of the center of a generally circular workpiece relative to a turning axis of the workpiece using a line source of optical radiation.

Another object of the present invention is to provide an apparatus for and method of overcoming inaccuracies in determining the position of a wafer center relative to an axis of a spindle which turns the wafer in an apparatus to determine the relative position of the wafer center and the spindle axis, wherein tendencies of a drive motor for the spindle to turn the wafer at differing speeds is overcome.

SUMMARY OF THE INVENTION

In accordance with one aspect of the invention, the center of a workpiece having a generally circular periphery is detected relative to a rotation axis of the workpiece by turning the workpiece about the rotation axis while strobing a source of optical radiation directed at the wafer on and off many times. The radiation is strobed on at different angles $\theta_i$ during turning of the workpiece about the rotational axis, where i=1, 2, ..., N. The source, each time it is strobed, causes a line of optical radiation to be incident on the workpiece along a line extending from the axis to the workpiece periphery. The optical radiation extends along the line beyond the workpiece periphery. Each of the strobes has a predetermined duration. The amount of optical energy in the line that is intercepted by the wafer is detected during each of the predetermined durations at each of the angles $\theta_i$. Each of the angles where the detector is read out is monitored to cause the source to be strobed on and data from the detector to be read at the predetermined angles. Thereby line length data from the detector are synchronized with data indicative of the turning angle of the workpiece about the rotation axis so data skew or latency between the line and angle data is avoided. Displacement of the center of the workpiece relative to the rotational axis is detected by combining indications of the determined lengths of the lines at the different angles $\theta_i$.

In accordance with another aspect of the invention, the center of a generally circular workpiece relative to a rotation axis of the workpiece is detected by an apparatus comprising a strobed source of optical energy for directing a line of optical energy at the workpiece, a drive for turning the workpiece about the rotation axis and a monitor for the angle of the workpiece about the axis. The optical energy, workpiece and rotation axis are arranged so some of the optical energy incident on the workpiece extends along a line between the axis and the workpiece periphery and some of the optical energy in the line extends beyond the workpiece periphery. An optical detector with a linearly extending optical detector area optically aligned with the line incident on the workpiece extends beyond the workpiece periphery. The optical detector is arranged to derive an output having a value dependent on the amount of optical energy from the source incident thereon each time the source is strobed. The source is turned on for a predetermined interval and the detector is read out aperiodically in response to the monitor detecting the workpiece is at predetermined angles about the axis. Circuitry responsive to indications of (1) the amount of energy derived from the detector each time the source is strobed on and (2) workpiece rotation angle about the rotation axis each time data from the detector are read out determines the length of a line extending from the rotation axis to the workpiece periphery each time the line source is strobed. The circuitry combines the determined line lengths for each of the predetermined angles to determine the displacement of the workpiece center relative to the rotation axis.

An additional aspect of the invention relates to a method of overcoming a tendency for inaccuracies to occur in readings obtained from an optical detector with a linearly extending optical detector area optically aligned with a line of optical radiation derived from an optical radiation source. The optical detector derives an output signal having an amplitude dependent on the amount of optical energy in the line that is incident on the detector. The optical energy from the line source is directed toward a generally circular workpiece turned about a rotation axis so the amount of optical energy incident on the detector depends on the length of a line extending between the rotation axis and the workpiece periphery. The inaccuracies have a tendency to occur because a motor shaft turns the workpiece at different speeds about the rotation axis. The method comprises strobing the optical source on many times for time intervals having known lengths while the motor turns the workpiece about the axis. The detector accumulates the optical energy incident thereon over the time intervals of known lengths each time the workpiece turns about the rotation angle through a predetermined angle to substantially overcome the tendency. Preferably, the rotation angle of the workpiece about the rotational axis is monitored and the detector is strobed on each time the workpiece has been monitored as turning to or through a predetermined angle about the rotation axis.

The detecting step is preferably performed by a charge coupled device array responsive to the optical energy. Voltages accumulated on capacitors of the array are read out each time the workpiece rotates about the rotation axis to or through the predetermined angle.

More specifically, the invention relates to detecting a center point of a semiconductor wafer relative to a rotation axis of a spindle turning the wafer with an apparatus including a strobed line source of optical radiation directed at the wafer for a predetermined time interval. The optical source is arranged so the energy of the source, as incident on the wafer, extends beyond the wafer periphery and is part of a line extending through the rotation axis. A CCD linear optical detector array is optically aligned with the line extending through the spindle axis. The array responds to optical energy from the source at a point beyond the wafer periphery and detects the amount of optical energy intercepted by the wafer. A shaft encoder coupled with the spindle, CCD array and the line source causes readout of the array and energization of the source in response to the spindle having turned through a predetermined angle. Circuitry responsive to the optical detector determines the length of the line each time the detector source is read out. The circuitry detects the workpiece center relative to the spindle axis by combining the determined line length indications.

The apparatus, in the preferred embodiment, is part of a wafer processing system including at least one wafer processor. A robot moves the wafer so the wafer center is coincident with the rotational axis. A drive moves the wafer to the processor after the wafer has been positioned by the robot so its center is on the rotation axis and the wafer has been turned by the spindle so a peripheral point of the wafer where an abrupt curvature change occurs is at a predetermined angle.

The above and still further objects, features and advantages of the present invention will become apparent upon consideration of the following detailed description of one specific embodiment thereof, especially when taken in conjunction with the accompanying drawings.

DESCRIPTION OF THE PREFERRED EMBODIMENTS

Figure 1:
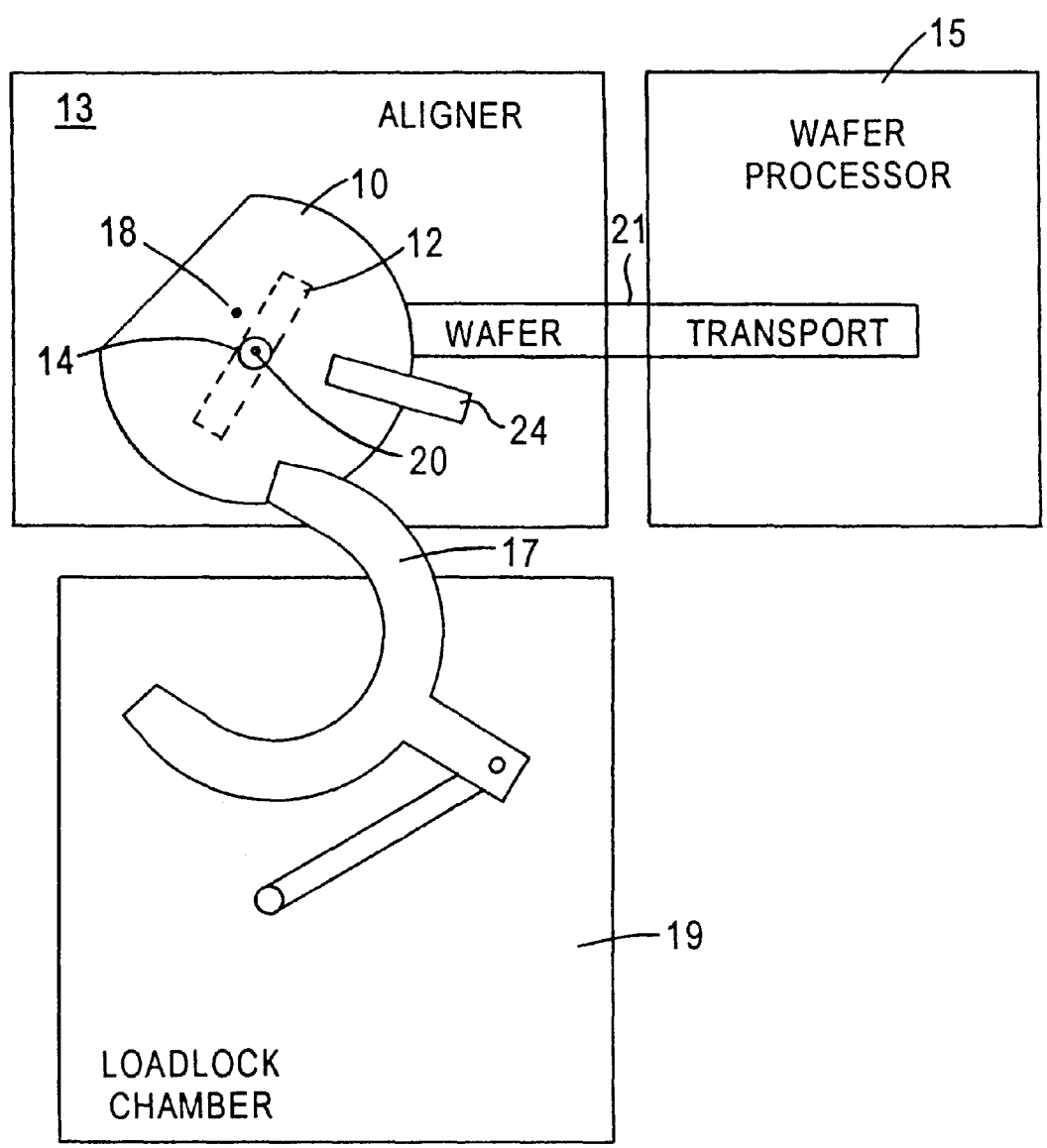
FIG. 1 is a schematic side view a preferred embodiment of an apparatus for performing the method of the present invention.
Figure 2:
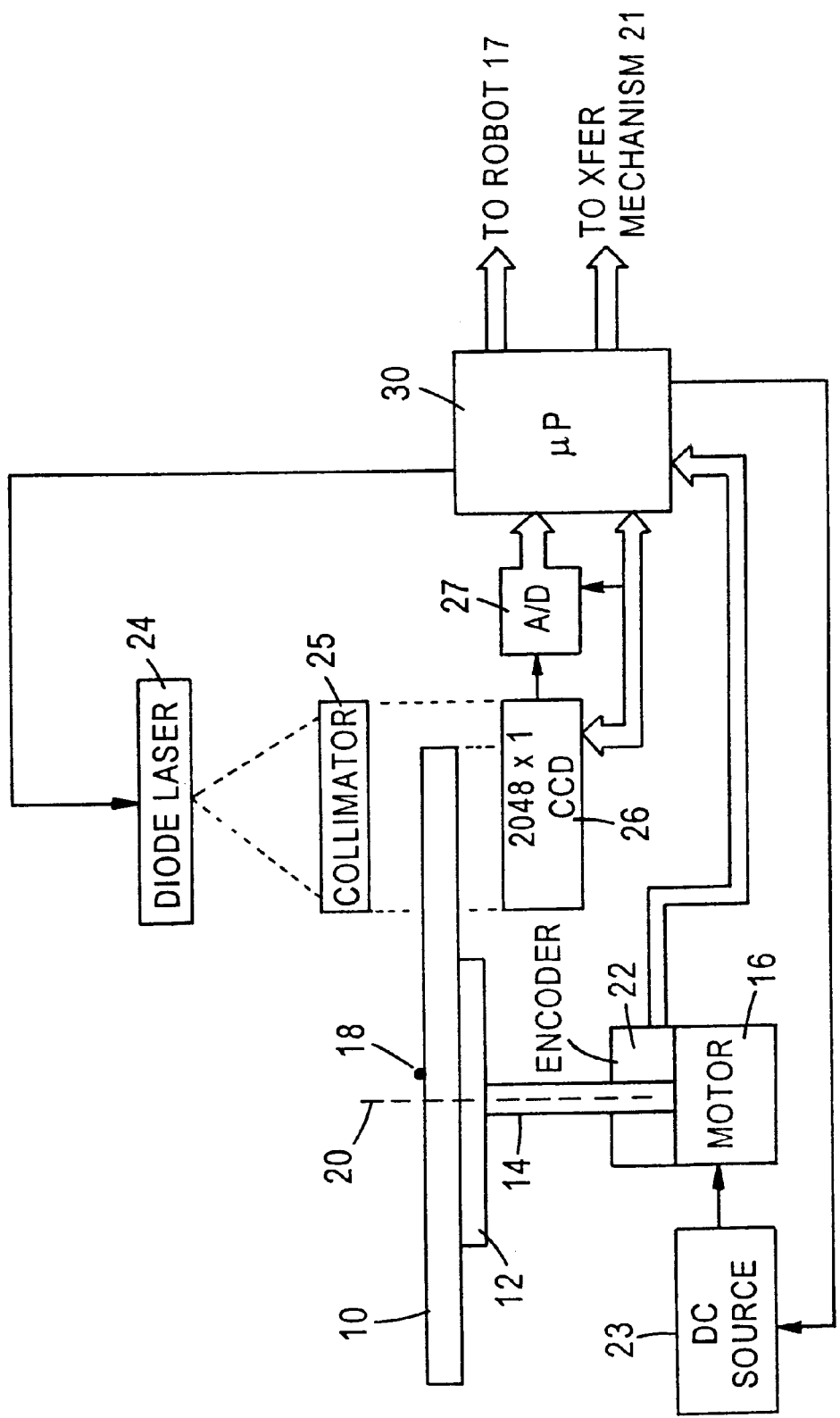
FIG. 2 is a schematic top view of a portion of the apparatus illustrated in FIG. 1.
Figure 3:
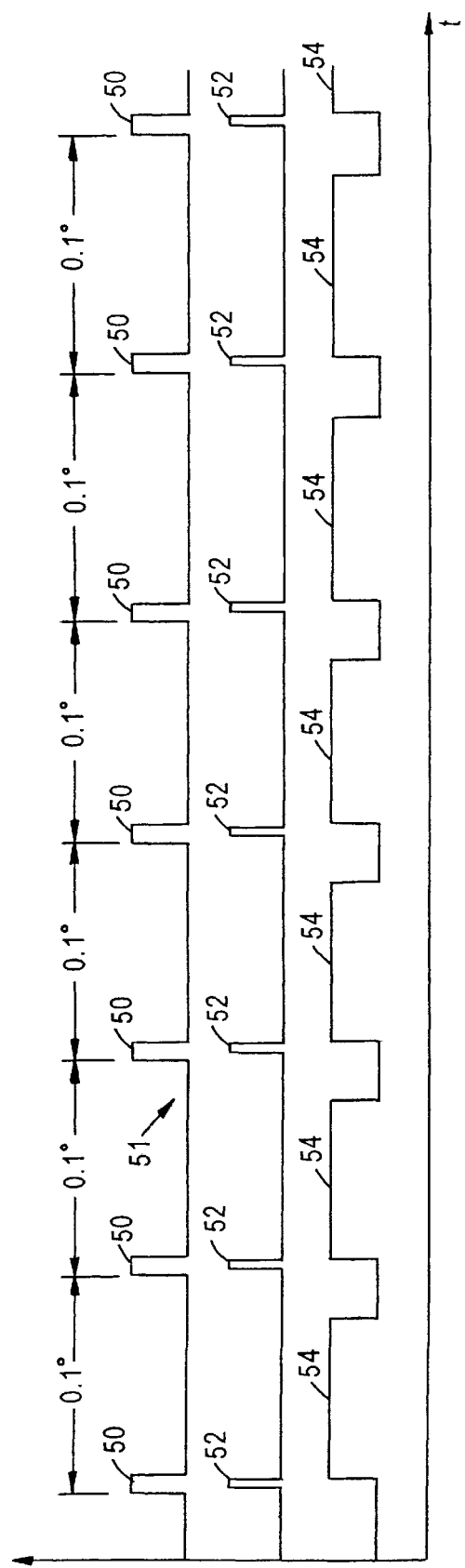
FIG. 3 includes a series of waveforms helpful in describing the operation of the apparatus illustrated in FIGS. 1 and 2.

Reference is now made to FIGS. 1 and 2 of the drawing wherein semiconductor wafer 10, having a generally circular periphery, is illustrated as being positioned on platform 12 of wafer aligner 13 of a semiconductor wafer processing system also including one or more wafer processors 15. Wafer 10 has a crystal axis indicated by the position of an abrupt change in curvature of the generally circular periphery of wafer 10. The abrupt change is typically a notch or one or more flats on the circular periphery of wafer 10. Aligner 13 and processors 15 are in a vacuum environment while robotic arm 17 moves wafers between load lock chamber 19 and aligner 13. Transport mechanism 21 moves wafers between aligner 13 and processors 15.

Platform 12 is rotatably driven by and fixedly attached to spindle 14, which is coupled to the output shaft of DC brush motor 16. Because wafer 10 is randomly positioned on platform 12 by robotic arm 17 the wafer centerpoint 18 is typically displaced from axis 20 of spindle 14 by a random distance. The wafer notch or flat is oriented at a random angle relative to a reference angle of spindle 14. The apparatus illustrated in FIGS. 1 and 2 determines the random displacement and orientation angle of centerpoint 18 of wafer 10 relative to the position of spindle axis 20 and a reference angle of the spindle in a highly accurate manner by activating motor 16 to drive spindle 14 through one revolution in about two minutes.

Motor 16 is supplied with a constant drive voltage by DC source 23 to theoretically drive the spindle at a constant rotation speed. In actuality motor 16 tends to drive spindle 14 at different rotational velocities, particularly at the beginning and end of each activation period of the motor. In one actual embodiment, motor 16 turned wafer 10 through 0.1° in about 1200 and 500 microseconds at the beginning and center portions of an activation period.

To monitor the angular position of spindle 14, 3600 count encoder 22 is mounted on the spindle. The angle read by encoder 22 is aperiodically detected by microprocessor 30 by the encoder each time spindle 14 turns to or is rotated through a predetermined angle, e.g. 0.1°. To these ends, encoder 22 supplies pulses 50 in wavetrain 51 to microprocessor 30 each time the encoder detects rotation of spindle 14 through the predetermined angle of 0.1°. Because spindle 14 turns at differing angular speeds, the time intervals between the antepenultimate and penultimate pulses and between the penultimate and last pulses of wavetrain 51 differ from the time intervals between the remaining pulses of wavetrain 51. Microprocessor 30 responds to each of pulses 50 to derive second and third pulses 52 and 54 having predetermined different durations, e.g. each pulse 52 has a 3 microsecond duration and each pulse 54 has a 400 microsecond duration for the above example. Encoder 22 supplies a multi-bit angle indicating digital signal to microprocessor 30 while the microprocessor derives pulses 54. The leading edges of pulses 52 are synchronized with and slightly trail the leading edges of pulse 50, while the leading edges of pulses 54 are synchronized with and slightly train the trailing edges of pulses 52.

An optical system including strobed diode laser 24 that is fixedly positioned above the top face of the wafer 10 is instrumental in determining the relative position of wafer centerpoint 18 and axis 20 of spindle 14, as well as the wafer orientation angle. Synchronization pulses 52 derived by microprocessor 30 turn on laser 24 for the predetermined, fixed duration of each of pulses 52. The optical energy derived by source 24 is supplied to optical collimator 25 which directs a linearly extending sheet or line of optical energy directed toward wafer 10. Optical energy derived by source 24 preferably has a wavelength of 670 nm and a power of 1 milliwatt. The line of optical energy propagating from collimator 25 incident on the top face of wafer 10 extends along a radial line intersecting axis 20. The line of optical energy derived from collimator 25 has sufficient length to extend beyond the edge of wafer 10 for any reasonable positions of the wafer centerpoint 18 relative to spindle axis 14, but does not go all the way into spindle axis 20.

Linear charged coupled device (CCD) array 26, preferably having a 2048×1 configuration of optically responsive capacitive detectors and a shift register stage associated with each detector, detects the length of the line of optical energy from source 24 which is incident on wafer 10 each time the source is strobed on. Capacitive optical energy detectors of CCD array 26 are optically aligned with the optical energy incident on the top face of wafer 10 and fixedly positioned beneath the wafer lower face. Hence the detectors of array 26, if projected upwardly to wafer 10, would coincide with the line of optical energy incident on the wafer top face and extending beyond the wafer periphery. The detectors of array 26 span a distance that is sufficiently long as to extend beyond the edge of wafer 10 to the same extent that the optical energy of source 24 extends beyond the wafer edge.

The capacitive detectors of CCD array 26, designed to be responsive only to the 670 nm wavelength optical energy derived from source 24, integrate the optical energy incident thereon each time the optical energy source is strobed on. Thereby, a voltage stored on each of the capacitive detectors of array 26 at the completion of each on strobe of source 24 indicates the amount of optical energy incident on the detector while the source was strobed on. The number of detectors in array 26 having optical energy incident thereon each time source 24 is strobed on at a particular angle indicated by encoder 22 is directly proportional to the complement of the length of the line along wafer 10 between spindle rotation axis 20 and the edge of the wafer since the optical energy is intercepted by the wafer and only the energy beyond the wafer periphery is incident on the detectors of the array. The optical energy is incident on each of these detectors of array 26 for the same length of time regardless of the angular position of spindle 14 and wafer 10 and the speed of motor 16 because source 24 is strobed on for a predetermined time interval at each of the angles indicated by encoder 22.

The voltage on each of the capacitive detectors in array 26 is transferred to the CCD shift register stage (not shown) associated with the particular detector in response to the leading edge of pulse 54, i.e. readout of the amount of optical energy accumulated by each of the detectors in array 26 during the on strobe of source 24 occurring between rotation of spindle 14 from angle $\theta_{i-1}$ to $\theta_i$ occurs when encoder 22 detects that the spindle is at angle $\theta_i$. The charges on the detectors in CCD array 26 are reset to zero in response to the trailing edge of pulse 54.

The voltages on the 2048 detectors of array 26 transferred to the 2048 shift register stages are read out in sequence from the shift register stages to a serial output terminal of the array. The array serial output terminal drives an input terminal of analog-to-digital converter 27 in response to a sequence of pulses microprocessor 30 supplies to the CCD shift register during pulse 54. Thereby, encoder 22 and CCD array 26, in combination with analog-to-digital converter 27, synchronously supply microprocessor 30 with digital signals indicative of the rotation angle, $\theta_i$, of wafer 10 relative to a reference angle of axis 20 and the amount of optical energy from source 24 at 2048 points along a line extending radially from axis 20 to beyond the wafer periphery at angle $\theta_{i-1}$.

Microprocessor 30 compares each of the 2048 digital signals from converter 27 for angle $\theta_{i-1}$ with a reference digital value read from a memory associated with the microprocessor to derive a binary zero or one value for each of the 2048 detectors of array 26. A binary one indicates the amount of optical energy incident on the particular detector of array 26 during the just completed on strobe of source 24 exceeded a threshold to signal that the periphery of wafer 10 was inside a region associated with that detector, while a binary zero indicates the opposite. Microprocessor 30 adds all the binary one signals for each angle $\theta_i$ to derive a signal indicative of the complement of the length of each line at each angle $\theta_i$ of optical energy of source 24 intercepted by wafer 10.

Use of analog-to-digital converter 27 enables the threshold level to be easily changed in the memory associated with microprocessor 30. In addition, the finite values read from converter 27 for the capacitors of array 26 enable microprocessor 30 to derive accurate indications of the amount of optical energy incident on the capacitive detectors of the array during testing intervals of the optical system. For example, during the testing intervals misalignment of capacitors in CCD array 26 relative to the line image derived by source 24 and collimator 25 is determined by microprocessor 30 indicating the amplitudes of the output voltages of the capacitive detectors.

Microprocessor 30 also supplies a signal to DC source 23 to command the source to supply a constant, non-zero DC voltage to motor 16 when arm 17 has put wafer 10 in place on platform 12, to thereby start the motor and begin turning wafer 10 about axis 20. Microprocessor 30 commands DC source 23 to stop motor 16 by signalling the source to supply a zero volt level to motor 16 in response to encoder 22 signalling that spindle 14 has turned through 360°, at the completion of a measurement cycle for the position of wafer 10.

For each of the angular positions of shaft 14 at which source 24 is strobed on, the memory stores signals indicative of (1) the angular position of shaft 14, as read by encoder 22, and (2) the length of the line on wafer 10 extending between shaft axis 20 and the wafer edge, as derived by the microprocessor in response to the output signals of analog-to-digital converter 27. From these stored values of angular position and line length, as well as a known value for the radius of wafer 10, microprocessor 30 computes the separation between shaft axis 20 and wafer center 18, as well as the angular position of the flat or notch in the circular contour of the periphery of wafer 10 relative to the reference angle of spindle 14; the reference angle, e.g., 0°, is indicated by a predetermined digital output of encoder 22.

Microprocessor 30 responds to abrupt changes in the determined lengths of the lines extending between axis 20 and the periphery of wafer 10 to determine the angular position of the flat or notch on the wafer periphery relative to the reference angle. As disclosed in the aforementioned co-pending application, microprocessor 30 determines the angular position of the abrupt change by taking the derivative of the determined line lengths; the derivative is taken relative to the angular positions read by encoder 22.

After microprocessor 30 calculates the separation of wafer center 18 relative to shaft axis 20 and the angle of the notch or flat relative to the reference angle, the microprocessor supplies a signal indicative of the separation distance to drive motors of robotic arm 17. Arm 17 then lifts wafer 10 from platform 12 and translates the wafer so the wafer centerpoint 18 and axis 20 of spindle 14 coincide. Microprocessor 30 then commands arm 17 to place wafer 10 back on platform 12. Details of the arrangement for translating wafer 10 are disclosed in commonly assigned U.S. Pat. No. 4,833,790. After microprocessor 30 has activated arm 17 so wafer centerpoint 18 and shaft axis 20 coincide, microprocessor 30 supplies DC source 21 with a signal to command motor 16 to turn platform 12 and wafer 10 so the notch or flat of the wafer is at the reference angle. When encoder 22 signals to microprocessor 30 that spindle 14 has been turned through the correct angle, as calculated by microprocessor 30, the microprocessor commands DC source 23 to stop motor 16. Thus microprocessor 30 compares the value of the orientation angle it calculated in response to the outputs of encoder 22 and CCD array 26 and the readings of encoder 22 after wafer 10 is positioned so centerpoint 18 and axis 20 coincide to control motor 16 so wafer 10 is correctly oriented.

After wafer 10 has been properly positioned on platform 12 so wafer centerpoint 18 and axis 20 are coincident and the notch or flat is at the predetermined angle, microprocessor 30 supplies a signal to transport mechanism 21 which moves wafer 10 from aligner 13 to wafer processor 15 in a manner well known to those skilled in the art.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A method of detecting the center of a workpiece having a circular periphery, the center of the workpiece being detected relative to a rotational axis of the workpiece, the method comprising turning the workpiece about the rotational axis while strobing a source of optical radiation directed at the workpiece on and off many times, N, the radiation being strobed on at different angles $\theta_i$ during turning of the workpiece about the rotational axis, where i=1, 2, ..., N; the source, each time it is strobed, causing a line of optical radiation to be incident on the workpiece along a line extending from the axis to the workpiece periphery, the optical radiation extending along the line beyond the workpiece periphery, each of the strobes having a predetermined duration, effectively detecting the amount of optical energy in the line that is intercepted by the workpiece during each of the predetermined durations at each of the angles $\theta_i$, determining the length of a line on the workpiece between the axis and the periphery at each of the angles $\theta_i$ in response to the amount of optical energy detected at each of the angles $\theta_i$, and detecting displacement of the center of the workpiece relative to the rotational axis by combining indications of the determined lengths of the lines at the different angles $\theta_i$.

2. The method of claim 1 further including moving the workpiece center to the rotational axis by responding to an indication of the detected displacement of the center of the workpiece relative to the rotation axis.

3. The method of claim 1 wherein the periphery deviates from a circle by having an abrupt curvature change at a predetermined point thereon, and further including detecting the angle of the abrupt peripheral change relative to a reference by detecting an abrupt change in the determined line lengths.

4. The method of claim 3 further including moving the workpiece center to the rotational axis by responding to an indication of the detected displacement of the center of the workpiece relative to the rotation axis, then rotating the workpiece about the axis so the predetermined point is at a predetermined angle.

5. The method of claim 1 further including monitoring the rotation angle of the workpiece about the rotational axis, the source being strobed on for the predetermined duration each time the workpiece has been monitored as turning to a predetermined angle about the rotation axis.

6. The method of claim 5 further including reading out the detected amount of optical energy each time the workpiece has been monitored as turning to the predetermined angle about the rotation axis.

7. The method of claim 1 further including monitoring the rotation angle of the workpiece about the rotational axis, and reading out the detected amount of optical energy each time the workpiece has been monitored as turning to the predetermined angle about the rotation axis.

8. The method of claim 1 further including monitoring the rotation angle of the workpiece about the rotation axis, the source being strobed on each time the workpiece has been monitored as turning through the same predetermined angle about the rotation axis.

9. The method of claim 1 wherein the detecting step is performed by a charge coupled device responsive to the optical energy, and further including reading out voltages accumulated on capacitive optical detectors of the device each time the workpiece is detected as turning to a predetermined angle about the axis.

10. Apparatus for detecting the center of a workpiece relative to a rotational axis of the workpiece, the workpiece having a generally circular periphery, the apparatus comprising a drive for turning the workpiece about the rotation axis, a strobed source of optical energy for directing a line of optical energy at the workpiece; the optical energy, workpiece and rotation axis being arranged so some of the optical energy incident on the workpiece extends along a line between the axis and the workpiece periphery and some of the optical energy in the line extends beyond the workpiece periphery, an optical detector with a linearly extending optical detector area optically aligned with the line incident on the workpiece and adapted to extended beyond the workpiece periphery, the optical detector being arranged to derive an output having a value dependent on the amount of optical energy from the source incident thereon each time the source is strobed on, and circuitry responsive to an indication of the amount of energy derived from the detector each time the source is strobed on for (a) determining the length of a line extending from the rotation axis to the workpiece periphery each time the line source is strobed and (b) combining the determined line lengths for determining the displacement of the workpiece center relative to the rotation axis.

11. The apparatus of claim 10 further including a monitor for the angular position of the workpiece about the rotation axis, the source being coupled with the monitor so the source is strobed on for a predetermined interval each time the workpiece is detected by the monitor as being turned to a predetermined angle about the rotation axis.

12. The apparatus of claim 10 further including a robot for moving the workpiece to cause the center of the workpiece to be moved to the rotational axis in response to the determined displacement of the workpiece center relative to the rotation axis.

13. The apparatus of claim 10 wherein the workpiece periphery deviates from a circle by having an abrupt change at a predetermined point on its periphery, the circuitry detecting (a) the abrupt peripheral change in response to an abrupt change in the determined length of the line and (b) the angle about the rotational axis where the abrupt change occurs.

14. The apparatus of claim 13 wherein the workpiece is a semiconductor wafer and the apparatus is part of a wafer processing system, the wafer processing system including at least one wafer processor, a robot for moving the wafer so the wafer center is moved to the rotational axis, and an arrangement for moving the wafer to the processor after the wafer has been positioned so its center is on the rotation axis and a peripheral point of the wafer where the abrupt change occurs is at a predetermined angle.

15. The apparatus of claim 10 further including a monitor for the angular position of the workpiece about the rotation axis, the circuitry being arranged so the circuitry is responsive to the detector output each time the monitor indicates the workpiece is at a predetermined angle about to the rotation axis.

16. A method of overcoming a tendency for inaccuracies to occur in readings obtained from an optical detector with a linearly extending optical detector area optically aligned with a line of optical radiation derived from an optical radiation source, the optical detector deriving an output signal having an amplitude dependent on the amount of optical energy in the line that is incident on the detector, the optical energy from the line source being directed toward a generally circular workpiece turned about a rotation axis so the amount of optical energy incident on the detector depends on the length of a line extending radially between the rotation axis and the workpiece periphery, the inaccuracies having a tendency to occur because a shaft turns the workpiece at different speeds about the rotation axis, the method comprising:

strobing the optical source on many times for time intervals having known lengths while the motor turns the workpiece about the axis, and accumulating the readings of the detector over the time intervals of known lengths each time the source is strobed on.

17. The method of claim 16 further including monitoring the shaft angular position and strobing the source on in response to the monitored shaft angular position having predetermined values.

18. The method of claim 17 wherein the readings obtained from the detector are derived in response to the monitored shaft angular position having predetermined values.

19. The method of claim 16 further including monitoring the shaft angular position, and deriving readings from the detector in response to the monitored shaft angular position having predetermined values.

20. Apparatus for detecting a center point of a workpiece relative to a rotation axis of a spindle turning the workpiece comprising a drive for turning the spindle, a strobed line source of optical radiation directed at the workpiece so the energy of the source as incident on the workpiece extends beyond the workpiece periphery and is part of a line extending through the rotation axis, a linear optical detector array optically aligned with the line extending through the spindle axis, the array being responsive to optical energy from the source at a point beyond the workpiece periphery and effectively detecting the amount of optical energy intercepted by the workpiece, a shaft encoder coupled with the spindle, the source and detector being responsive to the encoder so each on strobe of the source has a predetermined duration and occurs in response to the shaft encoder detecting that the shaft has moved through a predetermined angle and so the detector is read out in response to the shaft encoder detecting that the shaft has moved through the predetermined angle, circuitry responsive to the optical detector for determining the length of the line each time the source is strobed on and the detector is read out, the circuitry including an arrangement for deriving an indication of the optical energy incident on the array each time the source is strobed on and the detector is read out, the circuitry being arranged to combine the determined line length indications and detect the workpiece center relative to the spindle axis in response to the combined determined line length indications.

21. The apparatus of claim 20 wherein the workpiece is a semiconductor wafer and the apparatus is part of a wafer processing system including at least one wafer processor, a robot for moving the wafer so the wafer center is moved to the rotation axis, and an arrangement for moving the wafer to the processor after the wafer has been positioned by the motor so its center is on the rotation axis and the wafer has been turned by the spindle so a peripheral point of the wafer where an abrupt curvature change occurs is at a predetermined angle.

22. The apparatus of claim 20 wherein the array includes many elements for detecting the accumulated optical energy at different points along each of the lines, and an analog-to-digital converter arrangement responsive to the energy detected by the elements.

23. A method of detecting the center of a workpiece having a circular periphery, the center of the workpiece being detected relative to a rotational axis of the workpiece, the method comprising turning the workpiece about the rotational axis causing many, N, lines of optical radiation to be incident on the workpiece along many lines extending from the axis to the workpiece periphery while the workpiece is turning about the axis, the optical radiation extending along the lines beyond the workpiece periphery at different predetermined angles $\theta_i$, where i=1, 2, ..., N, detecting the amount of accumulated optical energy in the lines that is intercepted by the workpiece during each of many equal duration time intervals, reading the accumulated energy during each of the many intervals at times when the workpiece is at each of many determined angles, determining the length of many lines on the workpiece between the axis and the periphery in response to the accumulated energy readings, and detecting displacement of the center of the workpiece relative to the rotational axis by combining indications of the determined lengths of the many lines and the many determined angles.

24. Apparatus for detecting the center of a workpiece relative to a rotational axis of the workpiece, the workpiece having a generally circular periphery, the apparatus comprising a drive for turning the workpiece about the rotation axis, a source of optical energy for directing a line of optical energy at the workpiece; the optical energy, workpiece and rotation axis being arranged so some of the optical energy incident on the workpiece extends along a line between the axis and the workpiece periphery and some of the optical energy in the line extends beyond the workpiece periphery, an optical detector with a linearly extending optical detector area optically aligned with the line incident on the workpiece and extending beyond the workpiece periphery, the optical detector being arranged to derive an output each time the workpiece turns to a predetermined angle, the derived output having a value dependent on the amount of optical energy from the source accumulated by the detector during equal time intervals synchronized with the derived outputs, and circuitry responsive to an indication of the amount of energy derived from the detector each time the workpiece turns to one of the determined angles for (a) determining the length of a line extending from the rotation axis to the workpiece periphery at each of the determined angles and (b) combining the determined line lengths to determine the displacement of the workpiece center relative to the rotation axis.

25. A method of overcoming a tendency for inaccuracies to occur in readings obtained from an optical detector with a linearly extending optical detector area optically aligned with a line of optical radiation derived from an optical radiation source, the optical detector deriving an output signal having an amplitude dependent on the amount of optical energy in the line that is incident on the detector, the optical energy from the line source being directed toward a generally circular workpiece turned about a rotation axis so the amount of optical energy incident on the detector depends on the length of a line extending radially between the rotation axis and the workpiece periphery, the inaccuracies having a tendency to occur because a shaft turns the workpiece at different speeds about the rotation axis, the method comprising:

reading out indications of accumulated optical energy sensed by the detector during many time intervals having known lengths while the motor turns the workpiece about the axis, each indication being read out in response to the workpiece turning about the axis to each of many predetermined angles, and combining the read out indications with indications of the determined angles to detect the spacing of the workpiece centerpoint from the rotation axis.

* * * * *